United States Patent Office 3,804,756
Patented Apr. 16, 1974

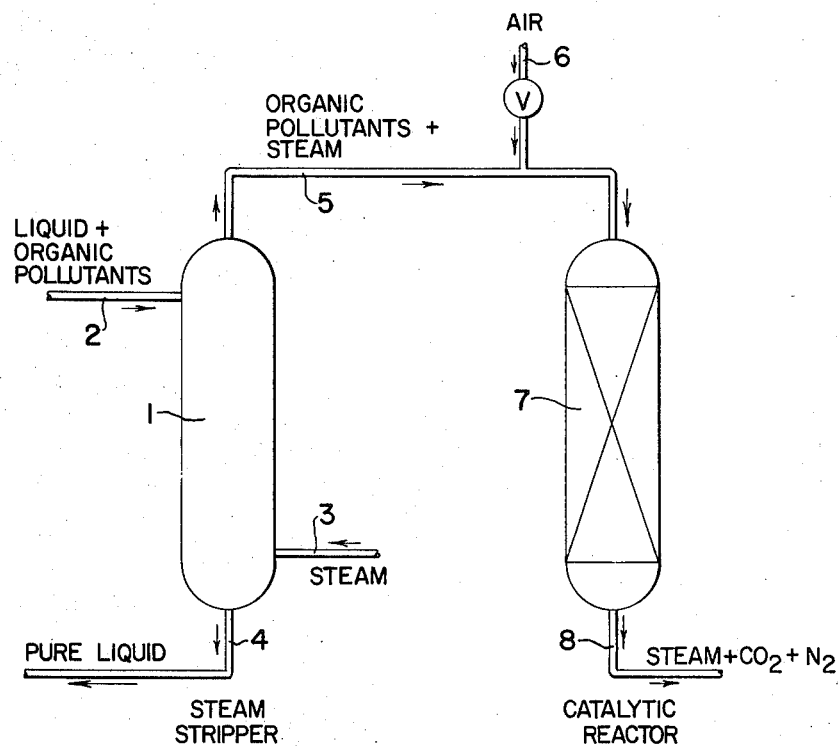

3,804,756
ENVIRONMENTALLY SAFE DISPOSAL OF ORGANIC POLLUTANTS
James L. Callahan, Bedford Heights, Harley F. Hardman, Lyndhurst, and Robert K. Grasselli, Chagrin Falls, Ohio, assignors to The Standard Oil Company, Cleveland, Ohio
Filed June 22, 1972, Ser. No. 265,162
Int. Cl. C02b 1/18
U.S. Cl. 210—59
8 Claims

ABSTRACT OF THE DISCLOSURE

Environmentally dangerous organic pollutants, such as hydrocarbons, alcohols, ethers, aldehydes, ketones, esters, acids, amines and the like are readily disposed of in an ecologically-safe manner by entraining the organic pollutants in a stream containing at least about 90% by volume of steam and passing the stream over an oxidation catalyst at a temperature of 250° to 700° C. The organic pollutants are conveniently converted to harmless nitrogen, water and carbon dioxide and valuable high temperature steam is obtained.

BACKGROUND OF THE INVENTION

Many streams containing noxious organic pollutants are released to the environments. Unfortunately, most of these streams contain only extremely dilute concentrations of these organic pollutants. Technology for handling these dilute streams on a commercial scale is not developed to a point where an inexpensive, viable process exists.

The waste streams encountered vary widely in composition. The organic pollutants may be essentially any combustible organic compound. Such compounds may be hydrocarbons, alcohols, aldehydes, ketones, esters, ether, acids, amines, cyanides and the like of essentially any molecular weight. The present invention can be applied to the safe disposal of any of these materials.

Catalysts useful for oxidizing organic coupounds are known. See, for example, German Pat. 2,026,185; U.S. 2,601,221; and U.S. 3,467,491.

SUMMARY OF THE INVENTION

It has now been discovered according to the present invention that organic pollutants can be disposed of in an evironmentally safe manner by (1) entraining the organic contaiminants in a stream containing at least about 90% by volume of steam, and (2) contacting the stream with a catalyst selected from the group consisting of oxidation catalysts or oxidants containing the oxides of copper, iron, manganese, bismuth, nickel, cobalt, uranium, molybdenum, vanadium, chromium, tungsten, palladium, platinum, silver, zinc, alkali meals, alkaline earth meals, tin, iridium, rhodium, ruthenium and antimony or mixtures thereof at a temperature of about 250° to about 700° C. The organic pollutants in this process are economically converted to harmless products of carbon dioxide, nitrogen and water.

The two-step process of the present invention is conveniently applied to any organic pollutant which is combustible and which contains no elements other than carbon, hydrogen, oxygen and nitrogen. Representative examples of such components include: hydrocarbons, such as methane, butane, propylene, butadiene, acetylene, hexane and decane; alcohols, such as methanol, ethanol, butanol, phenol, allyl alcohol and hexanol; aldehyde, such as formaldehyde, acetaldehyde, butyraldehyde and benzaldehyde; ketones, such as acetone, methyl ethyl ketone and methyl isobutyl ketone; esters, such as methyl acetate and ethyl butyrate; acids such as formic acid, acetic acid, propionic acid, valeric acid, adipic acid and benzoic acid; ethers, such as diethyl ether and methyl ethyl ether; amines such as ammonia, methyl amine, triethylamine and methyl dipropyl amine and aniline; and nitriles, such as acrylonitrile and benzonitrile. Preferred in the present invention is the proper disposal of organic pollutants which are hydrocarbons, alcohols, aldehydes, acids and amines of up to about 10 carbon atoms. Of special interest in the present invention is the disposal of ammonia and organic compounds of up to about 3 carbon atoms with the purification of streams containing ammonia and methanol being of special interest. The process of the present invention converts these organic pollutants discussed above to products which are harmless to the environment.

The organic pollutants rendered harmless by the present invention may be found in many industrial streams. For example, in the separation of carbon dioxide from a gas stream by the use of a potassium carbonate solution, a carbon dioxide stream containing organic impurities is obtained. This gas stream is treated in knock-out drums or spray towers where water is sprayed into the stream to remove the condensable and soluble impurities from the $CO_2$. This forms a very dilute aqeuous solution of the impurities. Of course, in the invention, this stream could be vaporized and reacted, but a preferred steam stripping treatment is discussed below.

As a second example, in an acrylonitrile plant, water quench of the reactor effluent forms a very dilute aqueous stream containing organic pollutants. This stream may be vaporized and reacted, or it may be treated by the methods described below.

As a third example, the effluent from a phenol plant generally contains at least trace amounts of phenol and other organic impurities. These must be treated before release to the environment.

As a fourth example, a municipal waste incinerator is operated and the effluent from the incinerator is scrubbed with water. The liquid effluent from the scrubber is transferred to a steam stripper. The steam stripper is operated to produce steam containing the pollutants entrapped by the aqueous wash. This contaminated steam is passed through the catalytic reactor to oxidize the pollutants to harmless products, and the effluent from the catalytic reactor is fed to a steam turbine power generator.

These situations and many more like them show the substantial need for the present invention.

As noted, one of the significant obstacles to the proper disposal of these organic impurities in the past has been the extremely dilute concentration of these impurities in the waste streams. Therefore, in the preferred practice of the present invention, the impurities are entrained in steam before the reaction. This entrainment in the preferred practice of the invention normally entails a concentration of the impurities.

The preferred method of entraining the organic pollutants is the steam stripping of the pollutants from the liquid in which they are contained. In this entrainment, steam is passed through the liquid containing the organic impurities, and these impurities are entrained in the steam. The stream thus formed is then passed on to the second step of the reaction.

The entrainment discussed can be used on essentially any liquid that will yield the undesirable organic pollutants in a steam stripping operation. Specifically, as applied to the $CO_2$ removal system, the impurities can be stripped from their dilute aqueous mixture by passing steam through a column containing the mixture. Under proper operation, essentially pure liquid water and a relatively concentrated vapor stream of contaminants in steam is obtained for further processing.

As applied to an organic liquid containing organic pollutants essentially the same techniques can be applied.

The object is to entrain the pollutants in steam. Thus, volatile impurities are conveniently stripped from the desired organic fluid by passing steam through the organic liquid and recovering the pollutants and steam as the vapor effluent.

Using any of these methods, a stream containing the organic pollutants and at least about 90% by volume of steam is generated. In the preferred practice of the invention, this stream consists of at least about 95% by volume of steam with the remainder being the undesirable pollutants in a relatively concentrated vapor stream of contaminants in vention.

The second step of the invention involves the conversion of the organic pollutants to harmless products. These products, water, carbon dioxide and nitrogen, can be freely released to the environment without ecological damage.

The conversion in the second step is accomplished by passing the stream of pollutants and at least about 90% by volume of steam over an oxidation catalyst at a temperature of about 250° to about 700° C.

An important aspect of the present invention is the use of catalysts to destroy the undesirable impurities. These catalysts may vary widely in composition. Essentially any catalyst that can accomplish the requisite oxidation described above can be employed.

Preferred in the present invention are those catalysts which contain copper oxide. This preference is dictated by the very desirable conversion of impurities obtained and by the special ability of the catalysts containing copper oxide for handling fluctuating quantities of impurities.

In the commercial application of the present invention, the feed to the second step of the process may vary widely with time. This variance is both in terms of quantity of pollutants and type of pollutants. Some catalysts are unable to cope with these changes. It has been our experience that the oxidation catalysts containing copper oxide are able to withstand rather broad fluctuations in the impurities.

As noted in the broad description of the invention, the catalyst employed may be an oxidant. An oxidant catalyst is one that has available oxygen under the conditions of reaction. Normally, such catalysts have two stable valence states. Suitable examples of these catalyst materials include copper and iron.

The catalysts used in the oxidation reaction may be used as the pure catalyst or they may be placed on a support. Suitable support materials include alumina, silica, zirconia, titania, silicon carbide, diatomaceous earth, pumice and the like.

In addition to the necessary steps of the present invention, it is desirable to add a further step in the ordinary operation of the process. This step injects molecular oxygen into the stream of organic pollutants and steam. This addition is usually accomplished with air, and it assures that there will be sufficient quantities of oxygen present to conduct the requisite oxidation. As an alternative to the addition of molecular oxygen, the oxidation catalyst could be continuously regenerated in a separate zone and used as an oxidant in the reaction of the invention.

Again in the discussion of the oxygen requirements of the catalyst, catalysts containing copper oxide are found to be preferred. The copper oxide catalysts have an amazing ability to retain relatively large quantities of usable oxygen. Thus, even when the organic pollutants and steam are passed over the catalyst in the absence of oxygen and even when there is no regeneration of the catalyst with oxygen, the copper oxide catalysts continue to be effective in the conversion of organic pollutants to harmless products. For example, consider a commercial operation where methanol and ammonia are being catalytically converted to carbon dioxide, water and nitrogen using the air injection. If this air injection is temporarily interrupted, a catalyst containing copper oxide continues to be effective, and the release of the pollutants to the environment is substantially reduced.

The conditions of the catalytic oxidation vary widely as different catalysts are employed and as different impurities are found in the system. As a general rule, relatively high temperatures from about 250° to about 700° C. are used, with temperatures above 300° C. being normally required for best results. For the use of the preferred catalyst containing copper oxide temperatures of about 300° to about 600° C. give a desirable reaction. The reaction may be conducted at atmospheric, super atmospheric or subatmospheric pressure, with near atmospheric pressure being preferred. The contact time may vary widely, but contact times of less than about 30 seconds normally give acceptable conversion of the impurities.

One very important advantage of the process of the present invention is that it can be used to provide a high temperature steam source. The effluent from the catalytic reactor has a very high heat value and contains no contaminants that would adversely affect most operations where steam input is required. Thus, the effluent from the catalytic reactor is suitably used as a heat source in a commercial plant. As a result, the waste streams that are normally discharged to the environment are now saved and recycled as useful process steam input.

DESCRIPTION OF THE DRAWING

The figure shows the preferred embodiment of the present invention consisting of a steam stripper, 1, and a catalytic reactor, 7. A liquid containing organic pollutants is fed through conduit 2, to the steam stripper, 1, Steam is passed through conduit, 3, into the liquid in the steam stripper, 1. The passing of steam through the liquid in the steam stripper, 1, separates the organic pollutants from the liquid. The resulting purified liquid is removed through conduit, 4. The organic pollutants are entrained in steam, and a stream of organic pollutants in steam leaves the steam stripper, 1, through conduit, 5. Air or molecular oxygen is optionally injected into the contents of conduit, 5, through conduit, 6.

The resulting mixture in conduit, 5, is then passed into the catalytic reactor, 7. This catalytic reactor, 7, contains an oxidation catalyst of the invention and is operated at a temperature of about 250° to about 700° C. In the catalytic reactor, 7, the organic pollutants are at least partially converted to the harmless products of carbon dioxide, nitrogen and steam. The effluent from the catalytic reactor contains steam and products as removed through conduit, 8.

SPECIFIC EMBODIMENTS

Example 1.—Removal of $CH_3OH$ and $NH_3$ pollutants

An aqueous stream containing very small amounts of ammonia and methanol is charged to a stripper. In the stripper steam is passed through the liquid containing the pollutants to strip the pollutants from the liquid. In this operation, a gaseous stream consisting of steam containing 2500 p.p.m. of methanol and 8450 p.p.m. of ammonia was obtained.

A sample of this gas stream was recovered for reaction according to the invention. A catalytic reactor consisting of a metal tube with an inlet for reactants and an outlet for products was constructed. Into this reactor was charged 205 g. of a catalyst containing 10% copper oxide on alumina which is sold as ⅛" pellets under the trade name Cu0803 by the Harshaw Catalyst Company.

The catalytic reactor was maintained at 900° F. and the pressure was 20 p.s.i.g. The gas stream from the $CO_2$ recovery system was mixed with 4% of air and passed through the reactor at an hourly space velocity of 2000.

The effluent of the reactor was analyzed, and it was observed that no methanol or other organic impurities were found and only 8 p.p.m. of NH₃ were unreacted. No nitrogen oxides were detected.

Examples 2-7—Reactions of various pollutant compositions over Cu 0803

In the catalytic reactor of Example 1, various gas compositions were reacted under various conditions. The feeds, conditions and results are given in Table I. In the effluent from the reactor, little or no nitrogen oxides were detected.

TABLE I.—REACTION OF STEAM CONTAINING VARIOUS AMOUNTS OF POLLUTANTS

| | Temp., °F. | Space velocity | Pressure, p.s.i.g. | Feed, p.p.m. | | Product, p.p.m. | |
|---|---|---|---|---|---|---|---|
| | | | | NH₃ | CH₃OH | NH₃ | CH₃OH |
| Example: | | | | | | | |
| 2 | 890 | 4,000 | 0 | 4,200 | 2,988 | 1,140 | 0 |
| 3 | 765 | 2,000 | 0 | 4,300 | 2,488 | 1,860 | 0 |
| 4 | 900 | 1,000 | 0 | 4,200 | | 80 | |
| 5 | 900 | 9,000 | 20 | 1,030 | 572 | 185 | 0 |
| 6 | 900 | 6,000 | 20 | 3,800 | 2,500 | 105 | 0 |
| 7 | 800 | 4,000 | 40 | 3,800 | | 941 | |

Example 8.—Ability of copper oxide to withstand upsets

As mentioned in the specification, there are two types of upsets that could adversely affect the conversion of the impurities to harmless products. An unusually large amount of impurities may come through or the oxygen may be shut off. In either case, the amount of oxidation required exceeds the molecular oxygen present. It is therefore necessary for the catalysts to supply this oxygen.

Using the catalyst and reactor of Example 1, steam containing 1800 p.p.m. NH₃ and 1000 p.p.m. of CH₃OH was passed over the catalyst at a temperature of 900° F. and a feed rate of 960 cc./hr. No oxygen was added to the feed. The analysis of the product at various times is given in Table II.

TABLE II.—CATALYTIC REACTION OF Cu 0803 WITHOUT OXYGEN ADDITION

| | Effluent composition p.p.m. | |
|---|---|---|
| | NH₃ | CH₃OH |
| Time, sec.: | | |
| 0 | 720 | <5 |
| 3 | 1,220 | <5 |
| 9 | 1,450 | <5 |
| 18 | 1,630 | <5 |
| 39 | 1,770 | <5 |

The reaction was continued until 3000 volumes of gas had been passed through the reactor. At that point, the amount of methanol fed was still 50% converted and the unconverted methanol in the reactor effluent was only 500 p.p.m.

In the same manner as shown by the examples above, other organic pollutants, such as hexane, butanol, diethyl ether, phenol, formaldehyde, acetaldehyde, acetone, valeric acid, ethyl acetate and trimethylamine, are converted to harmless products by passing a mixture of steam containing 1 volume percent of these pollutants over a copper oxide catalyst at a temperature of 600° C.

Also in the same manner as shown for the catalysts of the examples above, other catalysts, such as those containing oxides of: Cu, Mo and Fe; Cu, Te, Mn and Fe; Fe, Sn, Sb and U; K, W, V, Cr and Ni; the catalysts shown in East German Pat. 86,381; U.S. 2,601,221; U.S. 3,467,491; or West German Pat. 2,026,657; are employed in the process of the invention to convert organic pollutants to ecologically safe products.

We claim:
1. A process for converting pollutants comprising ammonia and other organic materials containing no major amounts of elements other than carbon, hydrogen, oxygen and nitrogen to environmentally harmless products comprising the steps of:
   (a) entraining said pollutants in a stream which consists of at least about 90% by volume of steam, and
   (b) contacting said stream in the vapor phase with an oxidation catalyst containing an oxide of copper at a temperature of about 250° to about 700° C. and at a substantially atmospheric pressure.

2. The process of claim 1 wherein the organic materials are hydrocarbon, ether, alcohol, aldehyde, ketone, ester, acid or amine, any of which may contain up to about 10 carbon atoms.

3. The process of claim 1 wherein step (a) is accomplished by stripping the organic materials from a liquid containing said pollutants by passing steam through said liquid.

4. The process of claim 1 additionally comprising the step of adding molecular oxygen to the stream obtained in step (a) prior to the contact with the oxidation catalyst.

5. The process of claim 1 wherein the temperature of the reaction in step (b) is about 300° to about 600° C.

6. The process of claim 1 wherein the steam obtained in step (a) consists of at least about 95% by volume of steam.

7. The process of claim 1 wherein the organic materials are methanol and ammonia, the oxidation catalyst is copper oxide, the temperature of reaction is 482° C. and the space velocity is 2000 reciprocal hours.

8. The process of claim 1 additionally comprising the step of recycling the effluent from the catalyst reactor in step (b) as process steam input.

References Cited

UNITED STATES PATENTS

| 3,054,653 | 9/1962 | Barton et al. | 210—63 X |
| 2,690,425 | 9/1954 | Moses et al. | 210—61 |
| 3,133,029 | 5/1964 | Hoekstra | 252—476 X |

FOREIGN PATENTS

| 1,031,751 | 6/1966 | Great Britain. |
| 669,645 | 3/1966 | Belgium. |

SAMIH N. ZAHARNA, Primary Examiner

B. CASTEL, Assistant Examiner

U.S. Cl. X.R.

210—63

PO-1050
(5/69)

UNITED STATES PATENT OFFICE
CERTIFICATE OF CORRECTION

Patent No. 3,804,756      Dated April 16, 1974

Inventor(s) James L. Callahan, et al.

It is certified that error appears in the above-identified patent and that said Letters Patent are hereby corrected as shown below:

Column 1 line 47 -- "contaiminants" should be --contaminants--

Column 1 line 54 -- "meals" should be --metals--

Column 3 line 11 -- should read "tants. This stream is treated in the second step of the invention Column 6 line 49 -- "catalyst" should be --catalytic--

Signed and sealed this 7th day of January 1975.

(SEAL)
Attest:

McCOY M. GIBSON JR.      C. MARSHALL DANN
Attesting Officer      Commissioner of Patents